United States Patent
Sammataro et al.

(10) Patent No.: US 9,169,971 B2
(45) Date of Patent: Oct. 27, 2015

(54) SEALED BEARING ASSEMBLY FAILURE DETECTION

(75) Inventors: Stephen R. Sammataro, Madison, CT (US); Michael F. Mullen, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 487 days.

(21) Appl. No.: 13/321,258

(22) PCT Filed: May 6, 2010

(86) PCT No.: PCT/US2010/033838
§ 371 (c)(1),
(2), (4) Date: Nov. 18, 2011

(87) PCT Pub. No.: WO2010/135087
PCT Pub. Date: Nov. 25, 2010

(65) Prior Publication Data
US 2012/0067671 A1    Mar. 22, 2012

Related U.S. Application Data

(60) Provisional application No. 61/179,338, filed on May 18, 2009.

(51) Int. Cl.
| | |
|---|---|
| *F01M 1/18* | (2006.01) |
| *F16C 33/30* | (2006.01) |
| *G01N 27/72* | (2006.01) |
| *F16C 23/06* | (2006.01) |
| *F16N 29/04* | (2006.01) |

(52) U.S. Cl.
CPC ..................................... *F16N 29/04* (2013.01)

(58) Field of Classification Search
USPC ................... 184/6.4, 7.4, 6.22; 384/624, 448; 324/204, 228
See application file for complete search history.

(56) References Cited

U.S. PATENT DOCUMENTS

| | | | |
|---|---|---|---|
| 3,442,249 A | | 5/1969 | Jamison et al. |
| 3,888,471 A | * | 6/1975 | Coch .............................. 266/120 |
| 4,119,284 A | | 10/1978 | Belmont |
| 4,516,520 A | * | 5/1985 | Whaley ......................... 116/217 |

(Continued)

FOREIGN PATENT DOCUMENTS

| | | |
|---|---|---|
| JP | 11-093957 | 4/1999 |
| JP | 2005-344784 | 12/2005 |

OTHER PUBLICATIONS

PCT International Search Report and Written Opinion, mailed Dec. 10, 2010.

*Primary Examiner* — William E Dondero
*Assistant Examiner* — Mark K Buse
(74) *Attorney, Agent, or Firm* — Carlson, Gaskey & Olds, P.C.

(57) ABSTRACT

A method and system for magnetically detecting thermal degradation of a component. A multiple of ferrous metal segments are attached to a component not within a lubrication circuit of a lubrication system with a thermally-affected bonding agent. The thermally-affected bonding agent is operable to detach at a threshold temperature at least one of the multiple of ferrous metal segments such that the at least one of the multiple of detached ferrous metal segments enters the lubrication circuit of the lubrication system. The at least one of the multiple of ferrous metal segments which detached are then detected within the lubrication system.

6 Claims, 7 Drawing Sheets

(56) References Cited

U.S. PATENT DOCUMENTS

| | | |
|---|---|---|
| 4,598,280 A | 7/1986 | Bradford |
| 4,812,826 A | 3/1989 | Kaufman et al. |
| 5,351,786 A | 10/1994 | Graham |
| 5,384,535 A * | 1/1995 | Mayeur .................. 324/204 |
| 5,583,441 A | 12/1996 | Bitts |
| 5,742,234 A | 4/1998 | Owen |
| 5,779,364 A | 7/1998 | Cannelongo et al. |
| 5,811,664 A * | 9/1998 | Whittington et al. ........ 73/53.07 |
| 5,896,034 A | 4/1999 | Marshall |
| 6,100,809 A | 8/2000 | Novoselsky |
| 6,861,836 B2 * | 3/2005 | Sammataro et al. .......... 324/200 |
| 8,502,527 B2 * | 8/2013 | Bradley et al. ............. 324/207.2 |
| 2007/0122070 A1 * | 5/2007 | Singh et al. .................. 384/448 |

* cited by examiner

SEALED BEARING ASSEMBLY FAILURE DETECTION

REFERENCE TO RELATED APPLICATIONS

The present disclosure claims the benefit of U.S. Provisional Patent Application No. 61/179,338, filed 18 May 2009.

BACKGROUND

The present disclosure relates to a system and method for failure detection.

Gearbox module failure detection is often provided by a magnetic chip detector. The detector collects magnetic particles caused by degradation of gear and bearing components within a gearbox housing and triggers a warning indicative of a potential failure. The detector operates in the presence of ferrous material such that when a single magnetic chip, or a collection of smaller chips suffices to bridge a gap in the magnetic chip detector completes an electrical circuit and a warning is triggered.

Sealed bearings typically have a grease lubricated bearing element with no active monitor. Over time, the sealed bearing may wear. This results in spalling debris which is contained within the sealed bearing by grease seals. As the spalling debris is contained within the sealed bearing, potential failure of the sealed bearing may be difficult to monitor even when the sealed bearing is located within a gear module which has a magnetic chip detector.

Periodic inspections of the sealed bearing for wear, excess play and binding may be manually performed. Although effective, such maintenance may be time consuming and require disassembly of the gear module.

SUMMARY

A method of magnetically detecting thermal degradation of a component according to an exemplary aspect of the present disclosure includes attaching a multiple of ferrous metal segments to a component not within a lubrication circuit of a lubrication system with a thermally-affected bonding agent. The thermally-affected bonding agent operable to detach at a threshold temperature at least one of the multiple of ferrous metal segments such that the at least one of the multiple of detached ferrous metal segments enters the lubrication circuit of the lubrication system. Detecting the at least one of the multiple of ferrous metal segments within the lubrication system.

An anti-torque system for a rotary wing aircraft according to an exemplary aspect of the present disclosure includes an outer ring of a sealed bearing and an inner ring of the sealed bearing. A bearing element between the outer ring and the inner ring. A multiple of ferrous metal segments bonded to the inner ring with a thermally-affected bonding agent, the thermally-affected bonding agent operable to break down at a temperature threshold and detach at least one of the multiple of ferrous metal segments from the inner ring.

A system according to an exemplary aspect of the present disclosure includes a lubrication system having a lubrication circuit. A component not within the lubrication circuit, the component having attached a multiple of ferrous metal segments with a thermally-affected bonding agent, the thermally-affected bonding agent operable to detach at a threshold temperature at least one of the multiple of ferrous metal segments such that the at least one of the multiple of detached ferrous metal segments enters the lubrication circuit of the lubrication system. A detector in communication with the lubrication system, the detector operable to detect the at least one of the multiple of ferrous metal segments which detach.

A rotary wing aircraft according to an exemplary aspect of the present disclosure includes a lubrication system having a lubrication circuit. A component not within the lubrication circuit, the component having attached a multiple of ferrous metal segments with a thermally-affected bonding agent, the thermally-affected bonding agent operable to detach at a threshold temperature at least one of the multiple of ferrous metal segments such that the at least one of the multiple of detached ferrous metal segments enters the lubrication circuit of the lubrication system. A detector in communication with the lubrication system, the detector operable to detect the at least one of the multiple of ferrous metal segments which detach.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1A:
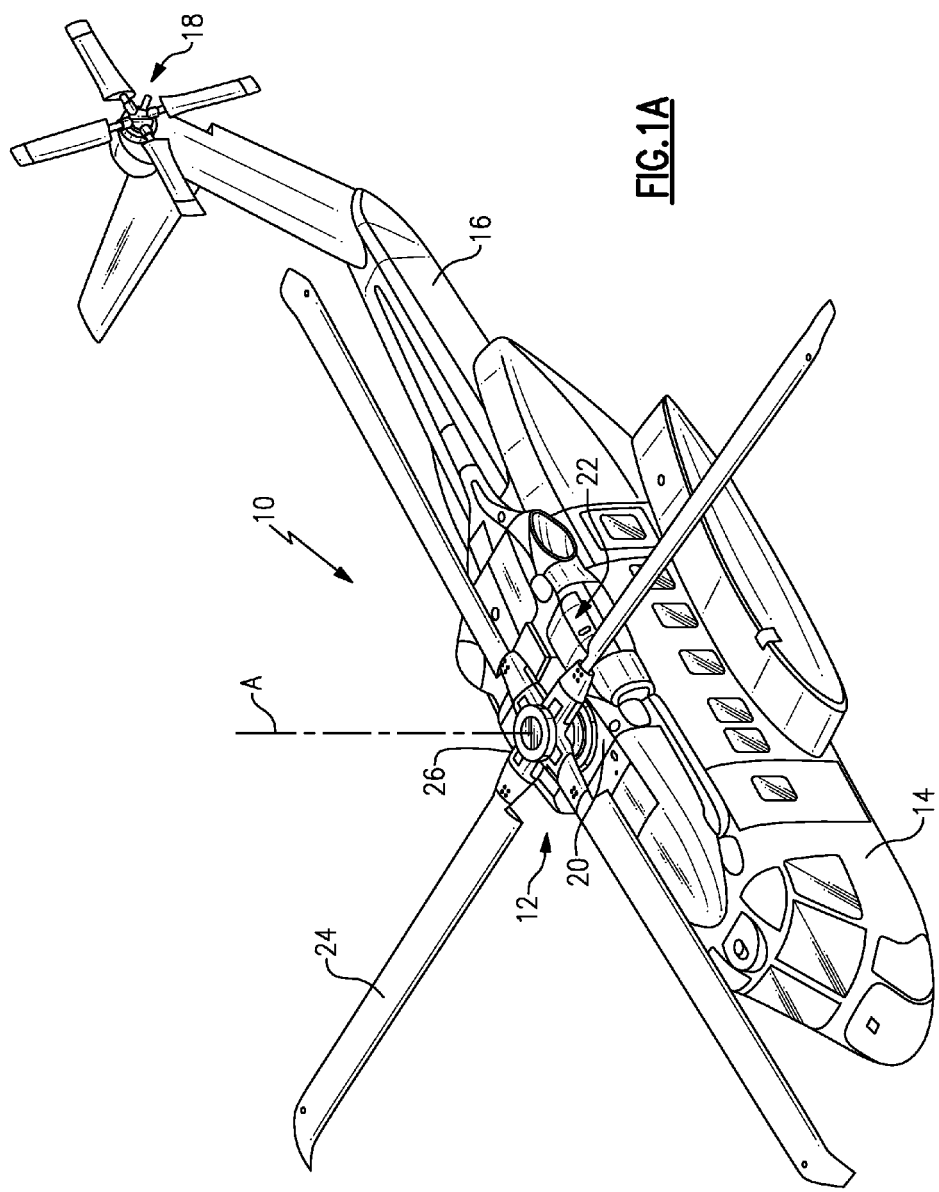
FIG. 1A is a general perspective view of an exemplary rotary wing aircraft embodiment for use with the present invention.
Figure 1B:
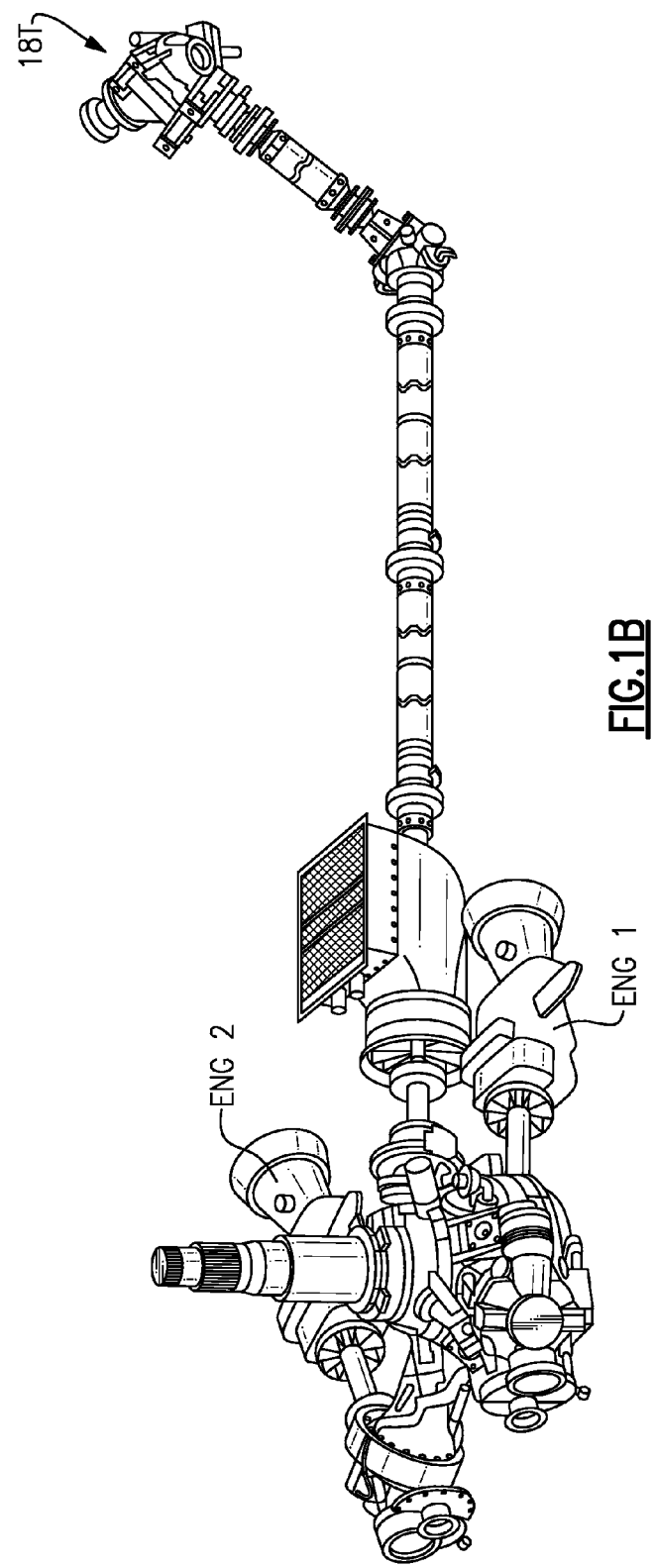
FIG. 1B is a schematic view of a drive system of a rotary-wing aircraft.

FIG. 1A schematically illustrates an exemplary vertical takeoff and landing (VTOL) rotary-wing aircraft 10. The aircraft 10 in the disclosed, non-limiting embodiment includes a main rotor system 12 supported by an airframe 14 having an extending tail 16 which mounts an anti-torque system 18. The main rotor assembly 12 is driven about an axis of rotation A through a main rotor gearbox (MGB) 20 by a multi-engine powerplant system 22—here having two engine packages ENG1, ENG2 (FIG. 1B). The multi-engine powerplant system 22 generates the power available for flight operations and couples such power to the main rotor assembly 12 and the anti-torque system 18 through the MGB 20. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines will also benefit herefrom.

Figure 1C:
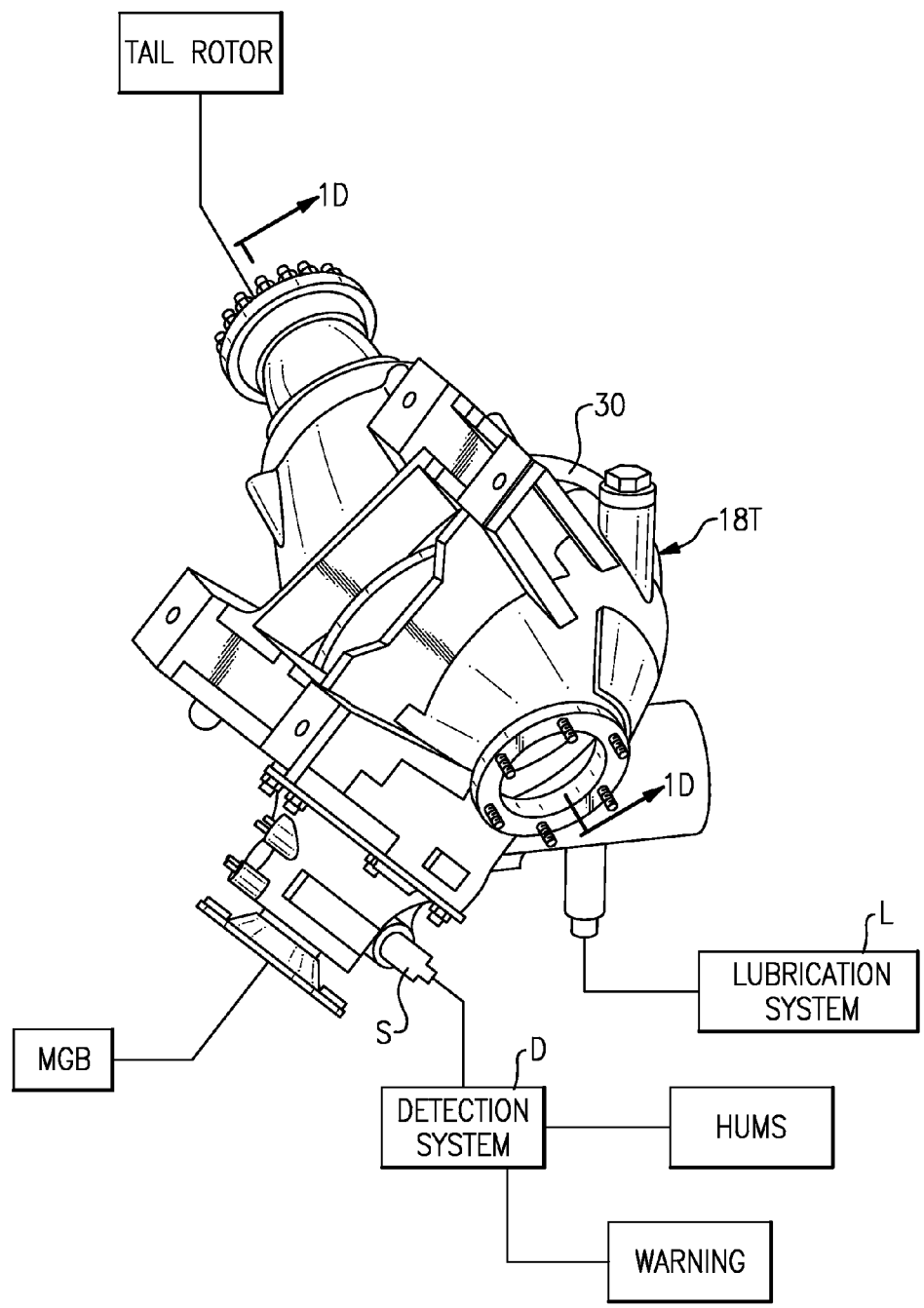
FIG. 1C is a schematic view of a gear module.

Referring to FIG. 1C, the anti-torque system 18 includes a gear module 18T (FIG. 1B) driven by the MGB 20. The gear module 18T generally includes a housing 30 which receives a continual flow of lubrication from a lubrication system L (illustrated schematically). The housing 30 also communicates with a detection system D (illustrated schematically) such as a magnetic chip detector which operates to detect potential gearbox failure as generally understood. The detection system D includes a sensor S within the housing 30 typically below a level of lubricant thereon (FIG. 1E). The detection system may further communicate with a Health and Usage Monitoring system (HUMS) or other data logging system which is operable to communicate a warning to the aircrew and maintenance personnel.

Figure 1D:
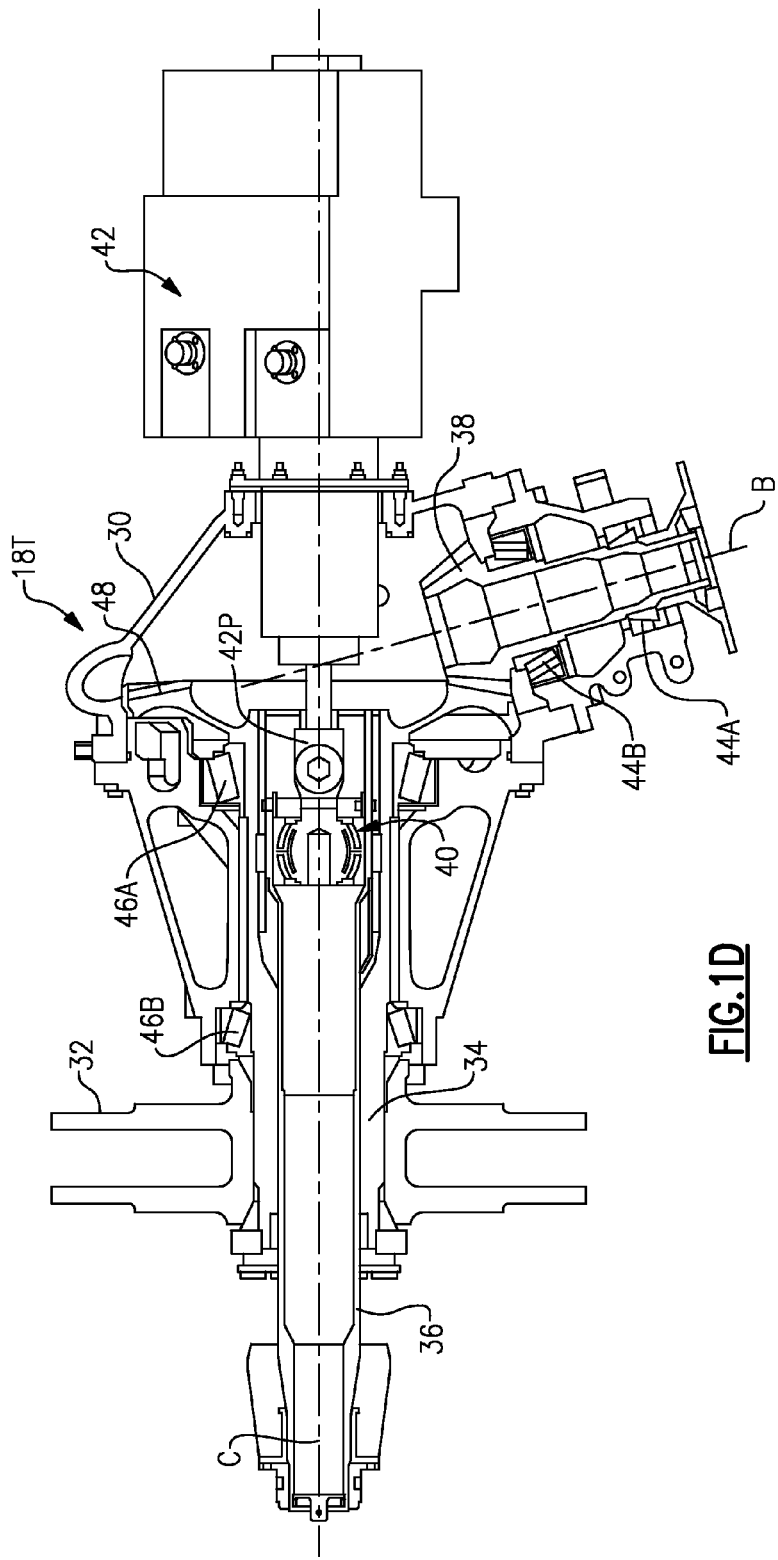
FIG. 1D is a sectional view of the gear module taken along line 1D-1D of FIG. 1C.
Figure 1E:
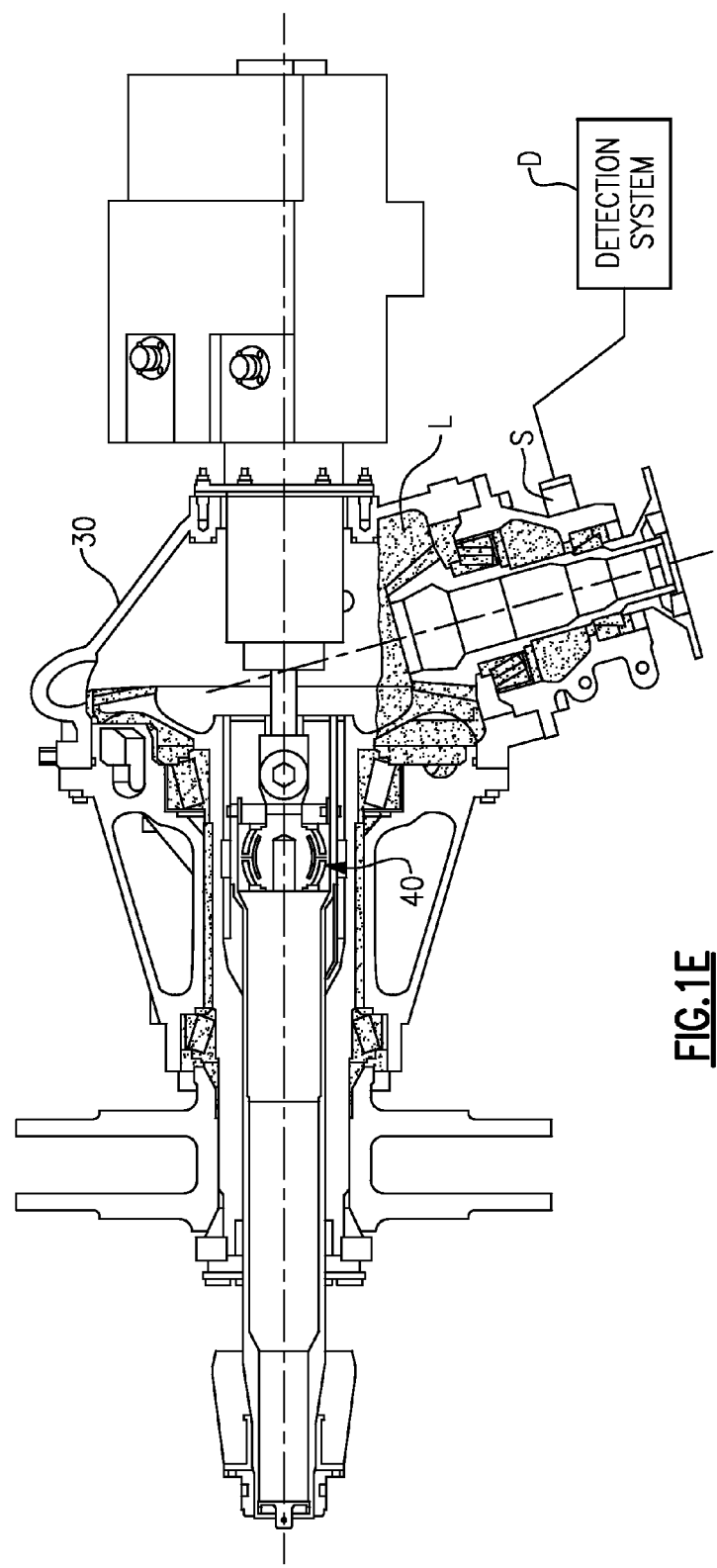
FIG. 1E is a schematic view illustrating a lubrication level within the gear module from a continual flow of lubrication from a lubrication system.

Referring to FIG. 1D, the gear module 18T generally includes the housing 30, a tail blade cuff assembly 32, a tail rotor drive shaft 34, a tail rotor pitch change shaft 36, a drive gear 38, a sealed bearing assembly 40 and a pitch change servo 42. The drive gear 38 is supported upon bearings 44A, 44B for rotation about an axis of rotation B. The tail rotor drive shaft 34 is supported upon bearings 46A, 46B for rotation about an axis of rotation C. The drive gear 38 engages a shaft gear 48 to rotate the tail rotor drive shaft 34 and the attached blade cuff assembly 32.

The tail rotor pitch change shaft 36 rotates with the tail rotor drive shaft 34 about the axis of rotation C, but serves no significant power transmission function. The tail rotor pitch change shaft 36 also slides along the axis of rotation C in response to actuation of the servo 42 to change the pitch of the tail blade cuff assembly 32 and the tail rotor blades attached thereto (not shown) and thus reduces or increases the thrust of the anti-torque system 18.

Referring to FIG. 1E, a continual flow of lubrication from the lubrication system L transits a lubrication circuit for communication with, for example only, each bearing 44A, 44B, 46A, 46B such that the lubricant is in fluid communication with the detection system D. Whereas the sealed bearing assembly 40 is a sealed bearing, any spalling debris is contained within the sealed bearing assembly 40 such that a potential failure of the sealed bearing assembly 40 may be difficult to monitor even though the sealed bearing assembly 40 is located within the housing 30 as the detection system D cannot directly identify a potential failure of the sealed bearing assembly 40.

Figure 2:
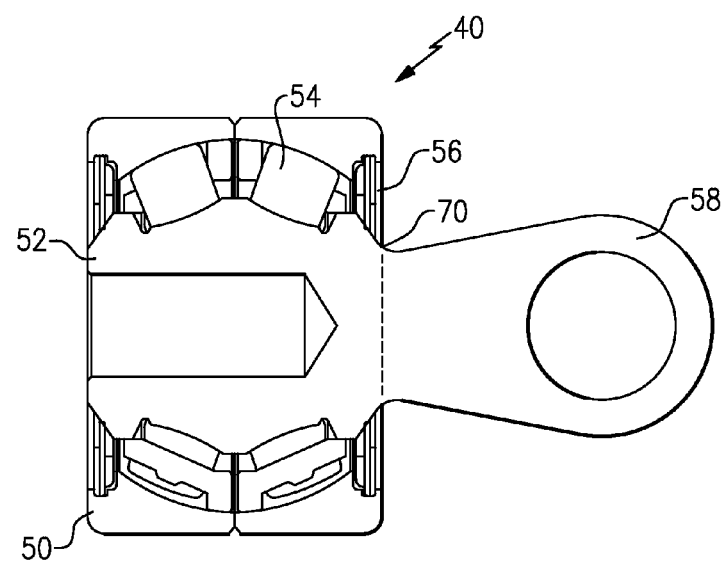
FIG. 2 is a sectional view of a sealed bearing assembly.
Figure 3:
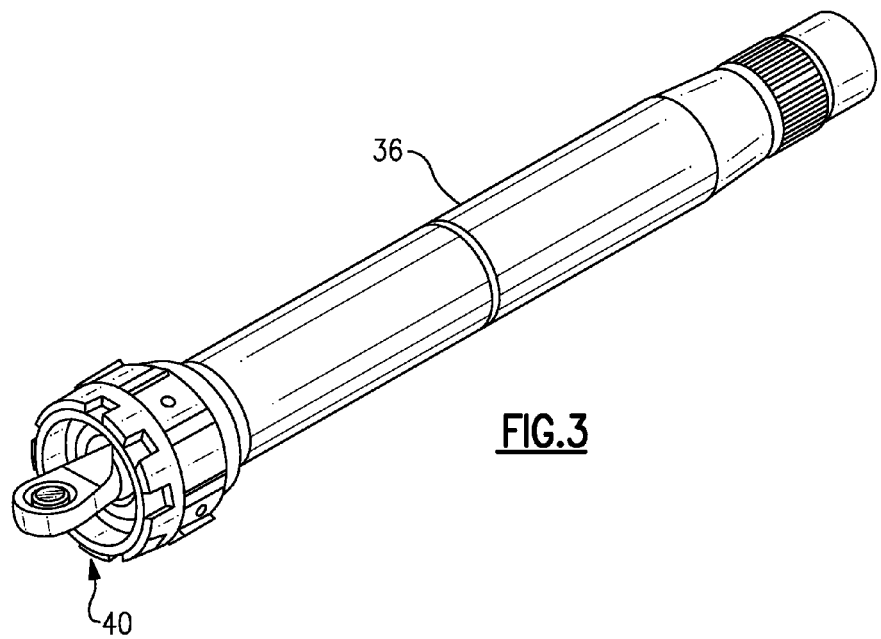
FIG. 3 is a perspective view of the sealed bearing assembly mounted within a pitch change shaft.

Referring to FIG. 2, the sealed bearing assembly 40 is mounted to the tail rotor pitch change shaft 36 (also illustrated in FIG. 3) to accommodate relative rotation between the tail rotor pitch change shaft 36 and a rotationally fixed servo pushrod 42P (FIG. 1D). The sealed bearing assembly 40 generally includes an outer ring 50, an inner ring 52 and a bearing element 54 therebetween. The bearing element 54 may be a ball bearing, spherical bearing or other bearing arrangement which is greased and sealed within the outer ring 50 by seals 56. The inner ring 52 defines a rod end 58 which connects with the servo pushrod 42P. The sealed bearing assembly 40 may be manufactured of a steel alloy or a non-ferrous material.

The sealed bearing assembly 40 includes a plurality of ferrous metal segments 70 bonded to the inner ring 52 with a thermally-activated bonding agent which will release the segments 70 when a desired temperature is reached such that the segments 70 become detectable by the detection system D. It should be understood that thermally-activated bonding agents as utilized herein may include but are not limited to, adhesives, solders, glues, tapes and other agents including those formed onto the segments 70. The desired temperature in the disclosed, non-limiting embodiment may be between 250-400 degrees F. (121-205 degrees Celsius). The segments 70 are sized so as to be small enough to be readily transported to the sensor S off the detection system D, but not so small as to be "burned off" with a fuzz burn feature typical of a magnetic chip detector.

The thermally-activated bonding agent may be selected so as to lose an amount of adhesion sufficient to release one or more segments 70 when a threshold temperature, e.g., indicative of imminent failure, is reached. As the component to which the segments 70 have been attached passes through the threshold temperature of the thermally-activated bonding agent, the segments 70 are released, pass through the lubrication system L, and are collected by the detection system D to generate an early signal that a bearing failure may be imminent.

Although bonded to the inner ring 52, it should be understood that the ferrous metal segments 70 may be bonded in any desired manner to any component of the sealed bearing assembly 40. The segments 70 may also be attached to any components not typically within the continual flow of lubrication but still likely to experience increased temperatures prior to a bearing failure such as components manufactured of ferrous and non-ferrous materials which include, but are not limited to, titanium, bronze, aluminum, nylon, composites, PEEK (PolyEtherEtherKetone) plastics, brass, magnesium, and combinations thereof. Furthermore, the ferrous metal segments 70 may alternatively or additionally be bonded to any surface of any gearbox component, part, or assembly of parts not typically within the continual flow of lubrication from the lubrication system but still likely to experience increased temperatures prior to a bearing failure.

The ferrous metal segments 70 may alternatively be provided with particular properties to facilitate specific identification from which component the segments 70 have detached. That is, sealed bearing assembly 40 may include one type of segments 70 which will provide one signal type to the detection system D, while another component may include segments of different properties which will provide a different signal type to the detection system 60. The different properties may include, for example only, various ferrous concentrations which are specifically identifiable by the detection system D. Other properties may include the length, diameter, chemical composition, and color of the segments 70 amongst a plurality of assemblies within a single housing yet maintain uniformity amongst the segments 70 attached to any single component. In this manner, examination of the segments collected by the magnetic chip detector will facilitate the determination of which component may be experiencing temperatures in excess of the temperature threshold.

Figure 4:
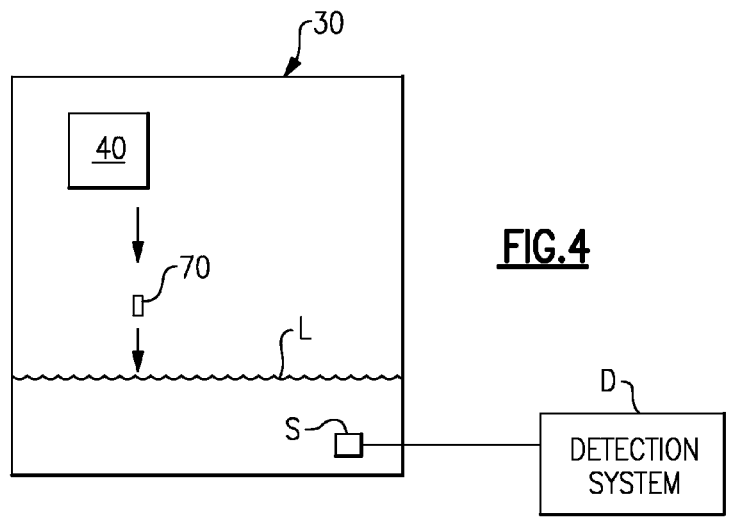
FIG. 4 is a schematic view of a non-limiting embodiment for magnetically detecting the thermal degradation of a component within a housing with a lubrication system.

In one disclosed non-limiting embodiment, the sealed bearing assembly 40, being sealed, is not within the continual flow of the lubrication system L lubrication circuit. The sealed bearing assembly 40 location within the housing 30, however, allows for the debonded segments 70 to be readily communicated into the lubrication system L and thus into contact with the detection system D (FIG. 4). Notably, the thermally-activated bonding agent will detach the segments 70 at a predefined temperature and the segments 70 essentially falls or are communicated from a "dry" section of the housing 30 which is not in the lubrication circuit of the lubrication system L into a "wet" section of the housing which is in the lubrication circuit of the lubrication system L and thus become "chips" identifiable by the detection system 60.

Figure 5:
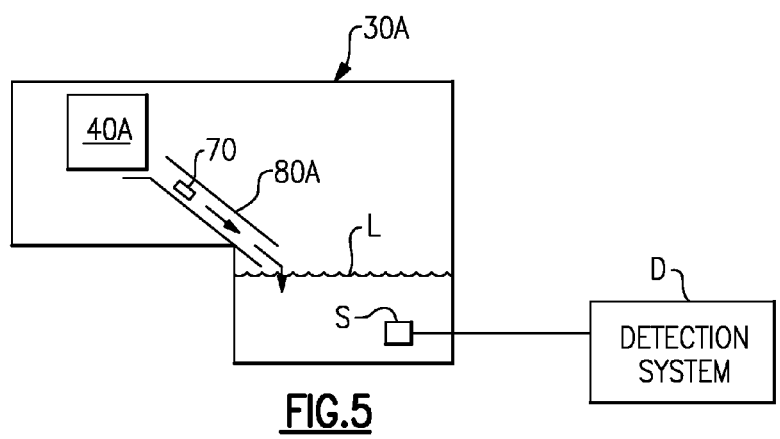
FIG. 5 is a schematic view of another non-limiting embodiment for magnetically detecting the thermal degradation of a component within a housing with a lubrication system.

Referring to FIG. 5, another disclosed non-limiting embodiment locates a sealed bearing assembly 40A within the housing 30A but in a position significantly remote from the lubrication system L. That is, no direct path is provided for the debonded segments 70 to essentially fall into the lubrication circuit of the lubrication system L. A guide 80A within the housing 30A that includes, but is not limited to, a tube, conduit, passage or other guide is positioned to capture the debonded segments 70 to transport the debonded segments 70 through the guide 80A and into the lubrication system L for detection by the detection system D.

Figure 6:
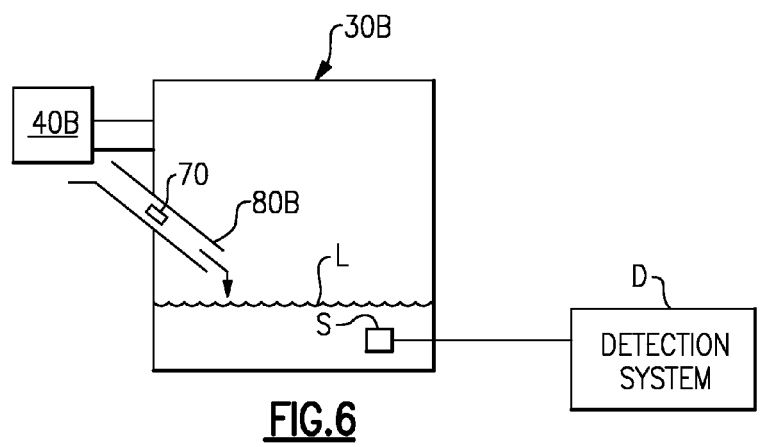
FIG. 6 is a schematic view of another non-limiting embodiment for magnetically detecting the thermal degradation of a component within a housing with a lubrication system.

Referring to FIG. 6, another disclosed non-limiting embodiment locates a sealed bearing assembly 40B external to the housing 30B but in a position remote from the lubrication system L. Another guide 80B is positioned to capture the debonded segments 70 external to the housing 30B and transport the debonded segments 70 through the guide 80B and into the housing 30B to the lubrication system L for detection by the detection system D.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An anti-torque system for a rotary wing aircraft comprising:
   an outer ring of a sealed bearing;
   an inner ring of said sealed bearing
   a bearing element between said outer ring and said inner ring; and
   a multiple of ferrous metal segments bonded to said inner ring with a thermally-affected bonding agent, the thermally-affected bonding agent operable to break down at a temperature threshold and detach at least one of the multiple of ferrous metal segments from the inner ring, said inner ring defines a rod end engageable with a servo.

2. The system as recited in claim 1, wherein said bearing element is sealed within said outer ring, said bearing element not within a lubrication circuit of a lubrication system within the anti-torque system.

3. The system as recited in claim 2, further comprising a guide between said inner ring and a flow of lubricant within the lubrication circuit, said guide operable to guide said at least one of the multiple of detached ferrous metal segments into the flow of lubricant within the lubrication circuit through said guide.

4. The system as recited in claim 2, further comprising a guide between said inner ring and the flow of lubricant within the lubrication circuit, said guide within a housing which contains said inner race, said guide operable to guide said at least one of the multiple of detached ferrous metal segments into the flow of lubricant within the lubrication circuit through said guide.

5. The system as recited in claim 2, further comprising a guide between said inner ring and the lubrication circuit, said guide at least partially external to a housing which includes the flow of lubricant within the lubrication circuit, the outer race external to said housing such that said guide is operable to guide said at least one of the multiple of detached ferrous metal segments into the housing.

6. An anti-torque system for a rotary wing aircraft comprising:
   an outer ring of a sealed bearing;
   an inner ring of said sealed bearing
   a bearing element between said outer ring and said inner ring;
   a multiple of ferrous metal segments bonded to said inner ring with a thermally-affected bonding agent, the thermally-affected bonding agent operable to break down at a temperature threshold and detach at least one of the multiple of ferrous metal segments from the inner ring; and
   a tail rotor pitch change shaft, said outer ring mounted to said tail rotor pitch change shaft.

* * * * *